(12) United States Patent
Katz

(10) Patent No.: US 7,155,238 B2
(45) Date of Patent: Dec. 26, 2006

(54) WIRELESS LOCATION DETERMINING DEVICE

(76) Inventor: Daniel A. Katz, 87 Tzahal st., Kiriat Ono (IL) 55451

( * ) Notice: Subject to any disclaimer, the term of this patent is extended or adjusted under 35 U.S.C. 154(b) by 0 days.

(21) Appl. No.: 10/710,379

(22) Filed: Jul. 6, 2004

(65) Prior Publication Data

US 2006/0009240 A1    Jan. 12, 2006

(51) Int. Cl.
*H04Q 7/20* (2006.01)
(52) U.S. Cl. .................. 455/456.1; 455/457; 455/41.2; 455/432.1; 455/456.2; 342/357.09; 340/539.13
(58) Field of Classification Search ............ 455/404.2, 455/456.1–456.6, 457, 43.1, 41.1, 41.2, 432.1, 455/435.2, 550.1, 552.1, 357.1, 357.06, 357.09, 455/583.13, 826.36, 10.1, 10.52, 426.2
See application file for complete search history.

(56) References Cited

U.S. PATENT DOCUMENTS

| | | | |
|---|---|---|---|
| 6,631,271 B1* | 10/2003 | Logan ..................... 455/456.1 |
| 6,657,586 B1* | 12/2003 | Turner .................... 342/357.07 |
| 6,934,540 B1* | 8/2005 | Twitchell, Jr. ........... 455/422.1 |
| 6,940,392 B1* | 9/2005 | Chan et al. ................. 340/10.4 |
| 2002/0098852 A1* | 7/2002 | Goren et al. ................. 455/456 |
| 2003/0054756 A1* | 3/2003 | Tyson ............................ 455/1 |
| 2003/0128100 A1* | 7/2003 | Burkhardt et al. ......... 340/10.1 |
| 2003/0210142 A1* | 11/2003 | Freathy et al. ......... 340/539.13 |
| 2004/0176032 A1* | 9/2004 | Kotola et al. .............. 455/41.2 |
| 2005/0058109 A1* | 3/2005 | Ekberg ....................... 370/338 |
| 2005/0096084 A1* | 5/2005 | Pohja et al. ............. 455/556.1 |

* cited by examiner

*Primary Examiner*—Joseph Feild
*Assistant Examiner*—Kamran Afshar

(57) ABSTRACT

The present invention discloses a system and a method to locate moving objects, such as people, pets and vehicles, over a wide area, by attaching small wireless devices, such as Bluetooth transceivers, to said objects and determining the location of said devices. The location of said wireless devices is determined by achieving ad-hoc short range wireless connectivity between said devices and communication devices such as Bluetooth enabled mobile phones that pass by, where said latter communication devices can be located by other means, such as GPS or network-based techniques.

21 Claims, 4 Drawing Sheets

WIRELESS LOCATION DETERMINING DEVICE

BACKGROUND OF INVENTION

Moveable or roaming objects, including persons and animals, may be required, for various reasons, to be located by a third party or system, from a remote location. Examples for such needs may include persons in distress, particularly children, adults or handicapped people that require assistance, lost pets, stolen vehicles to be restored and transported assets to be tracked on their way.

A conventional technique for locating roaming objects from remote location(s), involves utilizing wireless devices that are attached to these objects, in advance, and a radio network capable of communicating with these wireless devices and transmitting signals from which their location may be interpreted by a remote receiver. The communication channels in such network may comprise wireless and wireline elements, and the components of the network/system may be terrestrial, extraterrestrial airborne and space-borne. In some cases, this wireless location network serves also for telecommunications ("telecom") of generic information, such as voice, data or video signals.

One particular framework for wireless location is promoted by the U.S. Federal Communications Commission (FCC), in order to locate cellular handsets operated by people in emergency situations. This plan is known as the "E911" act, an augmentation to the "911" service (a service that is provided in the U.S.A.), designed to handle distress calls, either from fixed or from mobile phones. Currently, the 911 service is capable of locating fixed phones, while in the future it is planed to be capable of locating mobile phones as well, for the same purpose of emergency assistance. For further information, see: http://www.fcc.gov/e911/ and also CFR (Code of Federal Regulations) Title 47, Volume 2, Parts 20 to 39, [Revised as of Oct. 1, 1999] PART 20-COMMERCIAL MOBILE RADIO SERVICES—Sec. 20.18-911 Service.

Several methods are known in the art for wirelessly determining the location of roaming devices. One known group of methods is based on dedicated Telecom networks or dedicated segments of a Telecom network. These methods are usually referred to as "network based", i.e., they employ a wide area array of antennas and transceivers coupled together, such that a roaming wireless device can be located whenever being contained within the area that is covered by said antennas. Such methods usually require minimal modifications in the communication devices the location of which is to be determined by this network.

The latter methods are further subdivided into "sub-methods". One such sub-method measures the Angle of Arrival (AOA) of a signal emitted by a roaming wireless device, received at least at two of the network's antennas. Knowing the location of these antennas and the AOA of the received signal, the location of the roaming wireless device can be derived by trigonometric calculations.

Another sub-method measures the Time of Arrival (TOA) of a signal emitted by the roaming wireless device, received at least at three of the network's antennas. Knowing the location of these antennas and the TOA of the received signal, the location of the roaming wireless device can be derived. The TOA method is based on spherical radio navigation, i.e., the geometric locus of points having a same range from a fixed point is a sphere surface, the fixed point of which is its center. In case of TOA, the fixed points are the receiving network's antennas and the range is [TOA×C] for each receiving antenna, wherein "C" is the velocity of light or electromagnetic waves. The location of the roaming device is calculated as one of the two points, defined by the crossing sector of all three sphere surfaces (the crossing sector of two spherical surfaces is a circle, and this circle crosses a third sphere surface at two points). Sometimes, a fourth antenna is used to remove this ambiguity or to compensate for clock discrepancies.

The Global Positioning System (GPS), as described hereinafter, is based on a TOA method as well. In addition, if the roaming device is known to be essentially on the ground (e.g., mounted in a car), the earth globe, with proper topography, can be used as an additional reference "sphere" to refine the TOA calculations. This approach is especially useful for GPS navigating vessels, particularly in oceans, where the altitude is constant (i.e., is the sea level).

One useful variation of TOA is TDOA (Time Difference Of Arrival), where a difference in time of arrival of one transmitted signal is measured at two different receivers. This method was originally developed for radio navigation systems as LORAN-C and OMEGA, however slightly different—the time difference between two signals, transmitted synchronously from two remote sites, is measured at the LORAN-C or OMEGA receiver. Both variations of TDOA are based on hyperbolic radio navigation, i.e., the geometric locus of points that have a common difference in range from two fixed points is a hyperbola. In TDOA, as in TOA and GPS, time measurements provide range estimation ("pseudorange"), since [time×C=range]. In order to determine the actual location of a moveable device by TDOA, at least three reference antennas are required, to provide two hyperbolas that cross each other at one point, being the required actual location. For further information, see the book "AMERICAN PRACTICAL NAVIGATOR" by N. Bowditch, Pub. No. 9, volume 1, part eight (ELECTRONICS AND NAVIGATION), published by the DEFENSE MAPPING AGENCY HYDROGRAPHIC CENTER, USA DoD.

An exemplary system that utilizes TDOA and AOA methods for location determination is Sigma-5000 TDOA-AOA, which has been developed by "SigmaOne" (Rehovot science park, Israel). See also www.sigma-1.com/index_flash.htm. However, network-based methods for wireless location determination, require a dedicated infrastructure of antennas and transceivers, which is costly and takes substantial time to deploy.

Another known group of methods for wirelessly determining the location of roaming devices is based on self-location capabilities incorporated in the Telecom end unit (e.g., a wireless "handset" device). The unit location can be measured at the unit itself by utilizing corresponding sensors, embedded in the unit. Then, a signal representing this location is transmitted wirelessly over the network to a place where it is required. These methods are usually referred to as "handset based".

One handset based sub-method uses a GPS receiver embedded in a mobile Telecom unit. A GPS receiver measures its position by processing signals received from navigation satellites, launched by the U.S. Department Of Defense (DOD). Signals from at least 4 satellites are required to reach the antenna of the GPS receiver, in order to allow calculating its location. GPS technology is based on a TOA method, however slightly different—multiple transmissions are received at a single receiver. Due to clock discrepancies between satellites and GPS receivers, at least four in-view satellites are required in order to determine a GPS position (only three are required if the altitude is known, as in case of ocean navigation).

The GPS geographic position is expressed in latitude and longitude coordinates, in addition to altitude above sea level. GPS uses the World Geodetic System defined in 1984 ("WGS-84"). Though there are about 100 different local grids in use by cartographers in different parts of the world, in addition to different map projections, WGS-84 coordinates can be converted to any other reference grid.

GPS receivers have two different versions, military (P code) and civilian (C/A code). After the removal of the intentional degradation—"Selective Availability" (S/A) from the GPS signals, a C/A code GPS receiver can typically achieve an accuracy of better than 50 meters (rms). This position, practically expressed in about 10 bytes, can easily be transmitted over the network, by the same Telecom unit that contains the GPS receiver, to a place where it is required. For further information one might reference the web site www.trimble.com/gps/.

Examples for such prior art technologies are products of "SiRF" (California, U.S.A.) Particularly, those following SiRF's handset-based SiRFstar TM architectures SiRFstarI and SiRFstarII. For further information one might reference the web site www.sirf.com/.

Other prior art systems introduce capabilities for short-range wireless connectivity in cellular handsets and mobile computers. This type of connectivity is normally required for forming wLANs (wireless Local Area Networks) or wPANs (wireless Personal Area Networks), while the primary cellular network is usually referred as wWAN (wireless Wide Area Network). Usually, wLANs support faster data rates and larger transmission distances than wPANs. The typical state of the art of a wLAN transmitter range is about 500 meters, while a wPAN transmitter range is typically 10–100 meters. One specific standard for wLANs is IEEE 802. 11. WPANs typically replace short communication cables, supporting wireless handset peripherals, such as a keyboard, screen/display, headset, speaker and microphone, or data communications between a cellular handset and a Personal Digital Assistance (PDA), e.g., for updating a telephone list. One of the standards for short-range wireless connectivity (wPAN) is "Bluetooth" ("BT"), originally defined by Ericsson, Sweden, which utilizes wireless digital connectivity over the 2.4 GHz unlicensed band, using frequency hopping spread spectrum modulation, at 721 Kbps (revision 1.1). No line of sight is required between a transmitter and a receiver and the typical communication range is 10–100 meters, depending on which transmission class, chosen from one of the three available classes of maximum RF power, is in use: 1 mw (class 3), 10 mw (class 2) or 100 mw (class 1). Several schemes of power saving, error correction, authentication and encryption are included in the BT standard. Each BT device is assigned a unique 48 bits ID. BT devices form ad hoc "piconets", even among devices that have no previous coordination, with up to 8 peer devices, one of which is considered a master device. Basically, the unit that initiates the connection is defined as master of the piconet. However, these roles can be switched over. For further details, one might reference the web site www.Bluetooth.com.

Currently, state of the art of BT technology allows the implementation of almost a full BT digital radio, including RF and baseband circuitry, in a smaller than 10×10 mm chip size. For example, see Cambridge Silicon Radio (CSR) "bcO1" chip, Philips "PCD 87750" or Ericsson's "PBA 3131" radio chip.

Since BT chips are also low power consumers, typically 100 mw in active mode (receive or transmit—class 3) and about 1 mw in standby mode ("page scan" or "inquiry scan" or "park"), they fit battery operation, and particularly designed to be embedded in cellular handsets and portable computers.

Several models of BT-enabled cellular handsets have already been introduced to the market, as "Ericsson R520", "Nokia 6310" and "Motorola Timeport 270c".

U.S. Pat. No. 6,246,376 discloses a method for refining GPS positioning by data provided over a Bluetooth (BT) connection, or by the BT received signal. This method might be utilized, for example, for measuring azimuth. A cellular handset is utilized, which includes a GPS receiver, a BT radio and additional navigation circuitry, for example a "north-finder"/compass. Such handset calculates its position by GPS, while utilizing also the received BT data signal. However, handset-based wireless location devices are expensive, consume a considerable amount of power, are relatively big in size and radiate substantial RF power.

There is another group of known methods for wireless location, which is based on a combination of network and handset based capabilities. Such methods are usually referred to as "hybrid solutions". For example, WO/0150151 discloses a way for locating cellular handsets that include a GPS receiver. The data received by the GPS receiver is enhanced, particularly when satellites are blocked, by providing positioning data by nearby Bluetooth base stations.

Many wireless location systems are deployed and expected to be further deployed in the future, particularly systems to locate cellular handsets over cellular networks. The urge for the deployment is driven by Federal and state regulations, as well as by the need for location based commercial services.

All the methods described above have not yet provided satisfactory solutions to the problem of wirelessly determining the location of small, inexpensive and low power roaming devices, over a wide area, without requiring a dedicated infrastructure.

It is an object of the present invention to provide a system and method for wirelessly determining the location of devices, by leveraging the location determining capability of conventional positioning systems, such as those used to locate cellular handsets, to determine the location of a different type of wireless devices, smaller and cheaper, by wirelessly linking between both types of devices.

It is another object of the present invention to provide a system and a method for wirelessly determining the location of devices, by utilizing existing and widespread active Telecom units ("communication devices"), such as mobile telephones, to be used as gateways or access points for a second tier of wireless devices, forming a large and dense mobile communication infrastructure for said wireless devices, over a wide area.

It is still another object of the present invention to provide a system and a method for wirelessly determining the location of devices, by utilizing the existing infrastructure of a communication network having positioning capabilities.

It is yet another object of the present invention to provide a system and method for wirelessly determining the location of roaming objects in an area covered by a Telecom network, by using location determining devices which are small, inexpensive and having low power consumption.

It is yet another object of the present invention to provide a system and method for wirelessly determining the location of roaming objects in an area covered by a Telecom network, by using location determining devices, which emit low RF radiation and reduce potential risk to their carriers.

It is yet another object of the present invention to provide a system and method for wirelessly determining the location of roaming objects in an area covered by a Telecom network, by using location determining devices which do not require human interface/intervention.

It is yet another object of the present invention to provide a system and method for wirelessly determining the location of roaming devices, in an area covered by a Telecom network, that minimizes the amount of data that should be transmitted over the Telecom network.

Other objects and advantages of the invention will become apparent as the description proceeds.

SUMMARY OF INVENTION

The invention is directed to a system for determining the geographical location of roaming objects (such as persons, animals, vehicles, goods, mailed/delivered items ammunition and weapons), that comprises: a) a communication network, consisting of at least a plurality of communication devices, each of which having wireless and/or wireline communication capability with other communication devices over said communication network, wherein at least one of said communication devices is mobile (e.g. a cellular/mobile network), and of establishing wireless communication (e.g., according to Bluetooth or IEEE 802.11) with other wireless devices in the vicinity of said communication device, said communication network being capable of obtaining the geographical location of said communication devices and transmitting data representing said geographical location to a destination, over said communication network; b) a wireless tag, attached to each of said roaming objects, being a wireless device, in which a unique data is stored, said tag being capable of communicating with one or more communication devices and transmitting said unique data to said destination through said communication device(s) and over said communication network; and c) a control center (which may be a communication device) being, or linked to, said destination, for receiving said unique data from said tag and for using said unique data and the location of the communication device, through which said unique data is transmitted, for determining/displaying or forwarding the geographical location of said tag.

Preferably, each communication device comprises: a) a short-range wireless transceiver for communicating with one or more wireless tag(s) being in the vicinity of the communication device; b) a memory for storing multiple unique data transmissions from the same tag, and/or unique data transmissions from different tags; c) circuitry for transmitting the data to the destination, over the communication network; and d) a control circuitry for controlling the communication between the communication device and tags and the transmission of the unique data over the communication network.

Each communication device may further comprise location determining circuitry for determining the geographical location of the communication device (e.g. a GPS receiver) and circuitry for transmitting data representing the location to the destination.

Preferably, the tag comprises: a) a short-range wireless transceiver for communicating with one or more communication devices being in the vicinity of the tag; b) a memory for storing the unique data; and c) a control circuitry for controlling the communication between the tag and the communication device.

The data representing the location of the communication device may be determined either by the wireless communication network or by the communication device or by a combination thereof, and may be affiliated into the control signals that are transmitted from the communication device over the communication network, or transmitted as a user's message (e.g., Short Message Service [SMS] or General Packet Radio Services [GPRS]).

Preferably, the communication between tags and communication devices is established using unlicensed frequency band, around 2.4 GHz and power of transmissions, which is less than 100 mW. The tag preferably operates in its power save inactive mode, when communication is not required with communication device(s).

The unique data may be related to the tag's ID and/or to the time at which the unique data is transmitted. The time, at which the unique data is transmitted to communication devices, may be recorded by the communication devices. Whenever a new data signal is received by the communication device and its corresponding memory is full, the oldest data stored in the memory may be over-written by the new data.

Preferably, the control center interrogates the communication devices for the presence of tags in their vicinity, according to the tag ID, the time, the geographical region, or the ID of communication devices, or any combination thereof.

In one aspect, a subscriber that owns or operates a communication device permits utilizing the communication device for locating tags. The subscriber may be paid or otherwise benefit from utilizing his/her communication device for locating tags. Alternatively, communication devices will perform these functions as part of the basic mobile system and not require subscriber permission.

The data representation of the location of tag(s) may be converted from geographic coordinates to a corresponding physical address.

The wireless communication between the tag and the communication device may be initiated by each one of them, or by the control center, for determining a tag location. Alternatively, the location process may be initiated by a signal that is input to the tag by a device that is external to the communication network.

Communication between the tag and the communication device may be enabled only during specific periods of time, and/or when the communication device and/or the tag are part of a predetermined sub group.

The location accuracy of the tag may be refined by obtaining distance and/or direction information related to the relative position between the tag and the communication device, or by extrapolation, when the transmission of the unique data from the tag to the communication device and the determination of the location of the communication device are performed at different times.

The invention is also directed to a wireless tag, attached to a roaming object, for determining the geographical location of the roaming object, the tag being capable of communicating with one or more communication devices being part of a communication network, said communication network being capable of obtaining the geographical location of said communication devices and transmitting data representing said geographical location to a destination, over said communication network, said tag being capable of transmitting, through communication device(s) and over the communication network, a unique data to a destination, at which the geographical location of the tag is determined using the unique data and the location of the communication device, through which the unique data is transmitted, wherein at least one of the communication devices is mobile.

The invention is also directed to a communication device being part of a communication network that comprises other communication devices, said communication network being capable of obtaining the geographical location of said communication devices and transmitting data representing said geographical location to a destination, over said communication network, said communication devices being capable of communicating with each other and with the communication device, for determining the geographical location of a roaming object by determining the geographical location of a wireless tag, attached to the roaming object, the communication device being capable of communicating with the tag and transmitting, over the communication network, a unique data that is received from the tag to a destination, at which the geographical location of the tag is determined using the unique data and the location of the communication device, wherein at least one of the, or the other communication devices is mobile.

The invention is further directed to a method for determining the geographical location of roaming objects. A communication network that consists of at least a plurality of communication devices is provided, each of which having wireless and/or wireline communication capability with other communication devices over the communication network, such that at least one of the communication devices is mobile, and of establishing wireless communication with other wireless devices in the vicinity of the communication device, the communication network being capable of obtaining the geographical location of the communication devices and transmitting data representing said geographical location to a destination, over the communication network. A wireless tag being a wireless device, in which a unique data is stored, is attached to each of the roaming objects. The tag is allowed to communicate with one or more communication devices and to transmit the unique data to the destination through the communication device(s) and over the communication network. The unique data from the tag is received in a control center being, or linked to, the destination and the geographical location of the tag is determined using the unique data and the location of the communication device, through which the unique data is transmitted.

BRIEF DESCRIPTION OF DRAWINGS

The above and other characteristics and advantages of the invention will be better understood through the following illustrative and non-limitative detailed description of preferred embodiments thereof, with reference to the appended drawings, wherein:

FIG. 2 102b also illustrates the major components of a tag, the wireless locatable unit, according to a preferred embodiment.

DETAILED DESCRIPTION

Figure 1:
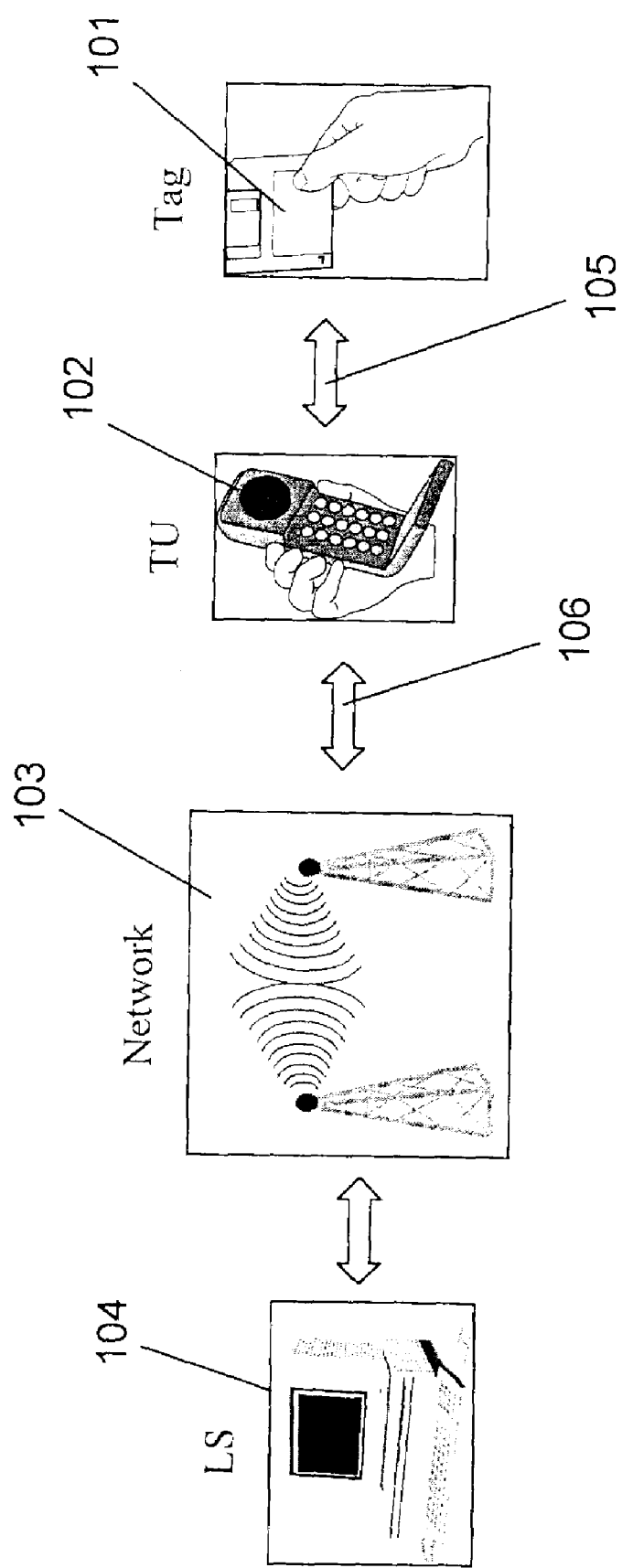
FIG. 1 illustrates a general system for determining the location of roaming devices in an area covered by a communication network (hereinafter referred to as "Telecom network") according to a preferred embodiment of the invention.
Figure 2:
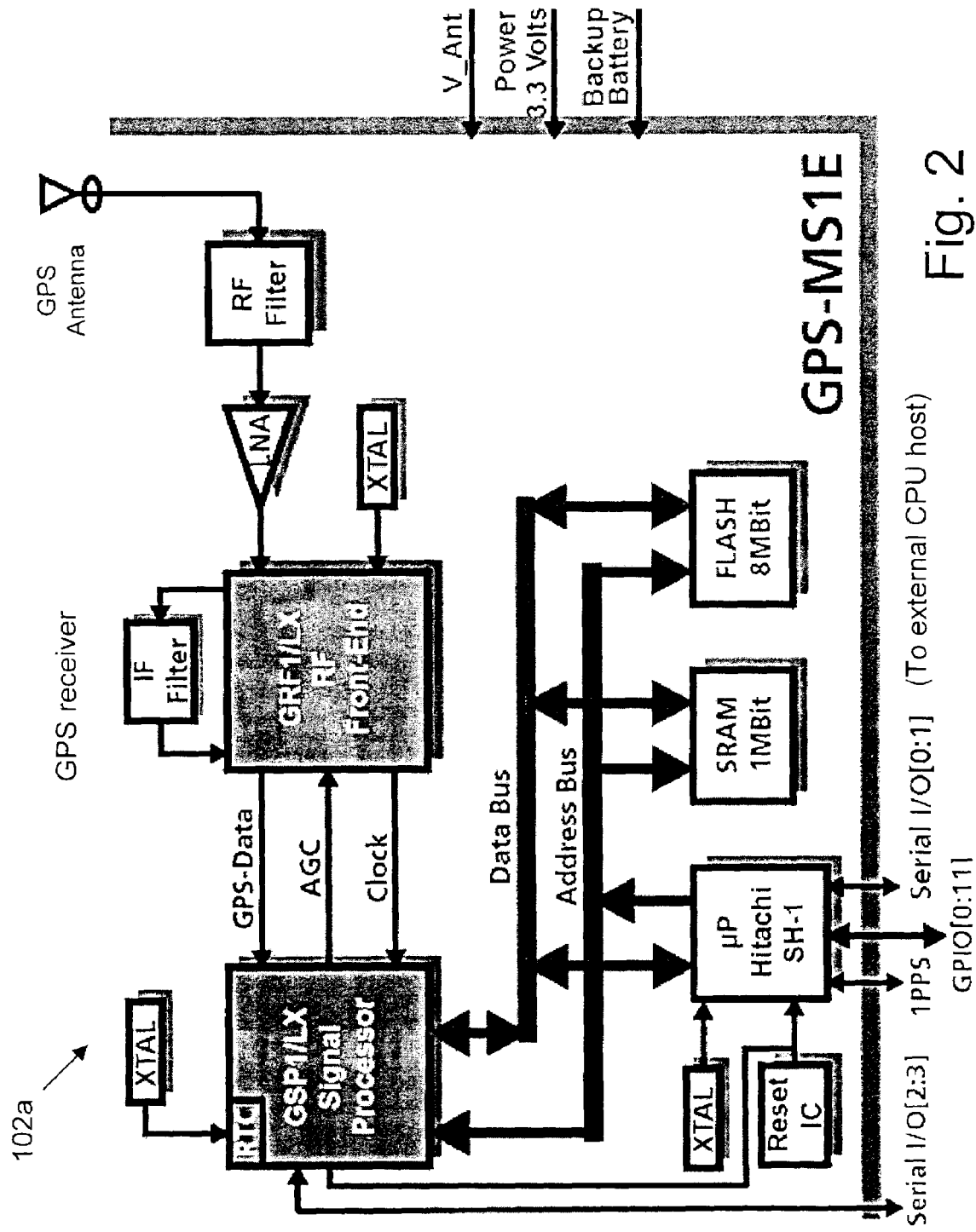
FIG. 2 illustrates the major components of a communication device (hereinafter referred to as TU) according to a preferred embodiment of the invention.
Figure 2:
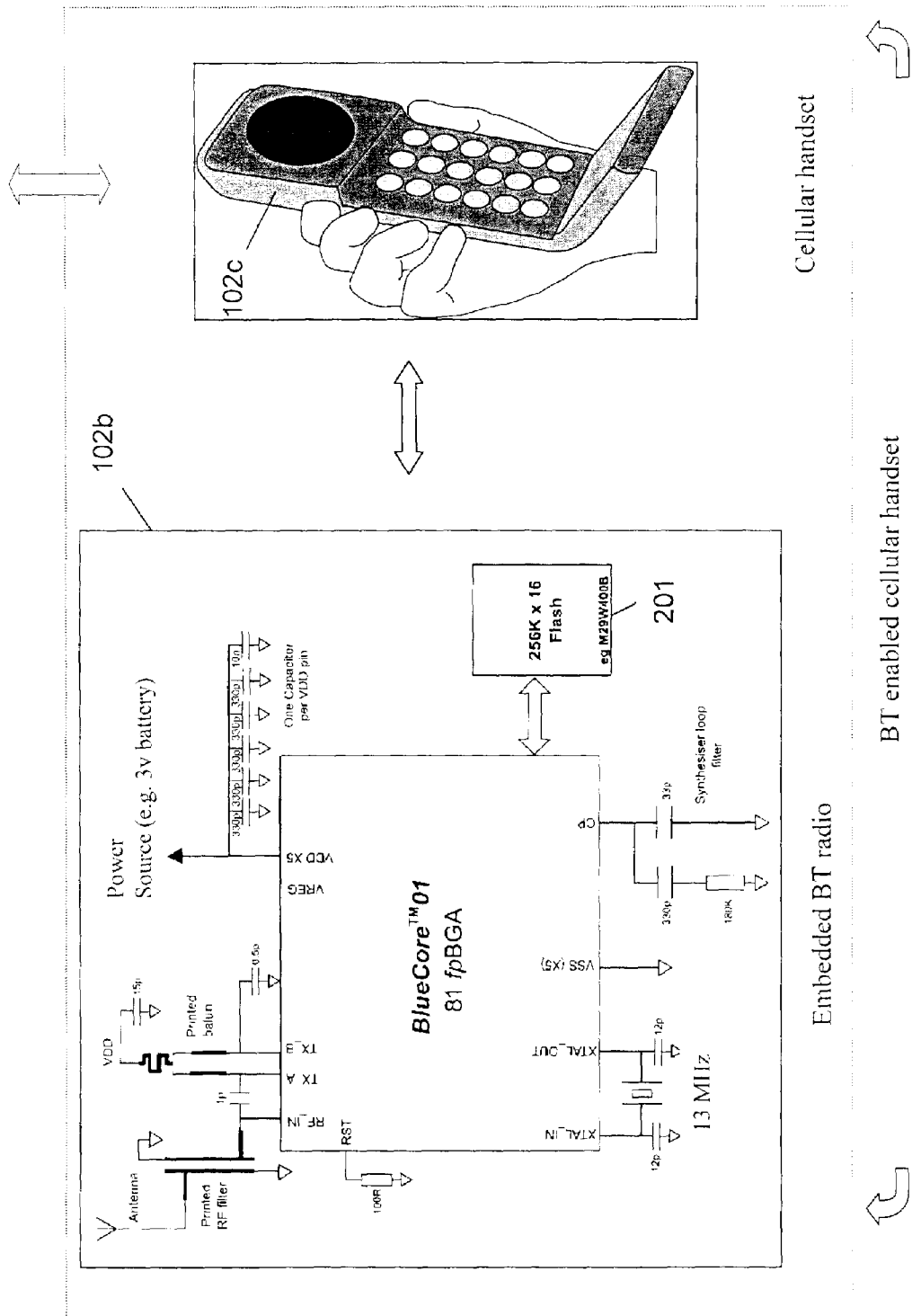

FIG. 1 is a block diagram of a system for determining the geographical location of roaming objects, in an area covered by a communication network (hereinafter referred to as "Telecom network"), according to a preferred embodiment of the invention. The system consists of at least one wireless tag 101, attached to a roaming object, in which a unique data is stored, a plurality of communication devices (hereinafter referred to as TUs, only one TU: 102 is shown), a wireless communication network 103 and a control center (i.e., LS: 104). Whenever required, the data stored in wireless tag 101 is transmitted to a destination (which may be, or may be linked to, control center 104),, trough TU 102 and over communication network 103. TU 102 and tag 101 obtain a short-range wireless transceiver (shown in FIG. 2), for communicating with each other. Preferably, communication network 103 is a cellular/mobile phone network and TU 102 is a cellular phone handset with an embedded GPS receiver and embedded Bluetooth ("BT") short-range radio (shown in FIG. 102). Alternatively, TU 102 may be a mobile telephone, a portable computer, an Access Point/gateway or a PDA. Wireless tag 101 is essentially a BT-based radio (as shown in FIG. 2 102b) powered by a power supply, preferably a small-sized battery (not shown). Alternatively, the communication between tag 101 and TU 102 may comply with communication standard IEEE 802.11 or, WiFi, WiMax or HomeRF. Control center LS 104 is a server computer, connected to communication network 103. The geographical location of TU 102 is determined by utilizing conventional technologies/methods (e.g., GPS). Therefore, the location of wireless tag 101, when in the vicinity of TU 102 and when a short-range wireless connectivity is achieved between them, can be determined. The data representative of the location of TU 102 may be determined by communication network 103, by TU 102, or by a combination thereof.

Attempts to establish a wireless connection between a wireless tag and a TU may be carried out either by the tag or by the TU; i.e., a tag may transmit inquiring/paging/seeking signals in order to interrogate for the presence of nearby TUs, and vice versa. However, in order to facilitate the understanding of the operation of the system, it is assumed that tags, such as tag 101, try to establish a wireless connection with TUs, such as TU 102, periodically, and TUs continuously monitor, and respond to, such inquiries. Since the nature of the communication between a tag and a TU is of short range, and assuming that tag 101 and TU 102 are close enough to each other for a sufficient period of time, a wireless link 105 is established and digital data is transmitted from tag 101 to TU 102. Preferably, tag-TU wireless connection 105 compiles with the Bluetooth standard, power class 2, typically covering a distance of 10 meters. Therefore, tag 101 must be located essentially within this range from TU 102, for several seconds, in order to allow successful determination of its location. Communication link 106 may be either wireline or wireless, or a combination thereof, for allowing communication with other components of the network, such as other TUs (i.e. similar to TU 102) and LS 104. Preferably, communication link 105 and communication link 106 utilize different frequency bands in order to avoid communication interference. Preferably, no prior knowledge of each other or synchronization ("pairing") is required between tags and TUs for establishing communication link 105, as long as they both comply with the same communication standard (e.g. BT standard), which supports ad hoc connections. In other words, as long as some commercial and procedural issues are set (perhaps a specific profile for location service is defined in future versions of BT standard) link 105 could be established between a tag that roams around the world (e.g. embedded in a letter), and BT-enabled cellular devices that are encountered on its way. Communication link 105 may be based on unlicensed frequency band, due to its short-range nature, particularly, on a frequency band around 2.4 GHz.

According to one aspect of the invention, tag 101 normally remains in a "power-save inactive" (i.e. "Standby") mode while no communication is required with TUs. However, a corresponding trigger signal (not shown) may switch it to active mode, to enable establishing BT connection 105 with any TU 102 in the vicinity of tag 101. The triggering signal may be prompted inside the tag, by a timer contained within the tag, or can be initiated from an external source, such as an alarm system. Once link 105 is established, the tag's ID is transmitted to the TU, with other optional data, such as the tag's battery status. Tag 101 remains in its active mode for a certain period of time, trying to establish a connection as many as N times, and, then, switches back to power-save mode. This policy is carried out in order to save the tag's battery power, but also to save "airtime" over the Telecom network. There is a trade-off in determining the parameter N: a high value increases the probability to determine the tag's location, but a low value saves tag's and TU's power and airtime over the network. At the TU, the tag's report may be recorded in a memory or storage array, or immediately relayed to LS 104. TU is preferably a cellular handset featured with a GPS receiver, so the handset's position at the time that the tag reported its ID is monitored and the control center that receives both the tag's ID and nearby TU location, can report the tag's location.

According to the preferred embodiment of the invention, LS 104 is a server allowing to locate tags of interest. Upon receiving a request from a client to locate a specific tag, at least one parameter from the group of {Tag ID; TIME; Geographical Region; TU ID} is used in the interrogation message/signal that is transmitted over the network, seeking TUs that are (or recently were, or will be) in contact with tags, according to said input parameters. The corresponding TUs transmit back the relevant data/records, to LS 104, then LS 104 reports to the client the results of this interrogation i.e., the current, or the last known, location of the tag, including the time that corresponds to this location. LS server 104 retrieves the tag's geographic coordinates (i.e., latitude and longitude) and using proper software (GIS—Geographical Information System) and digital maps, convert geographic coordinates into a corresponding physical address, being more friendly to the client.

FIG. 2 illustrates the building blocks of TU 102 (see FIG. 1). TU 102 comprises a cellular handset 102c, into which GPS receiver 102a and basic BT radio transceiver 102b are integrated, according to the preferred embodiment of the invention. GPS receiver 102a allows determining the location of TU 102, and BT radio 102b is a short-range radio that is utilized as a radio interface between cellular handset 102c and a nearby tag (not shown, but is illustrated in FIG. 2 102b) for allowing receiving a corresponding data signal from the nearby tag. The content of the data signal is related to the ID number/code of the tag and, optionally, to additional data, such as an input from an external alarm system (not shown).

Cellular handset 102c plus BT radio 102b form a BT-enabled cellular phone, which is implemented, for example, in the following commercial devices: "Ericsson R520", "Nokia 6310" and "Motorola Timeport 270c". In order to implement a TU according to the present invention, a GPS receiver should be added to the BT-enabled phone, such as 102a. FIG. 2 depicts a specific GPS module: GPS-MS1E, a product of u-blox from Switzerland. The GPS-MS1E module is based on the set of electronic chips SiRFstar/LX™ made by SiRF from U.S.A.

Alternatively, OEM GPS receiver 102a can be from Trimble USA (e.g. "Lassen LP GPS" or "SVeeEight Plus GPS™ module"—see http://www.trimble.com/oem.html) or u-blox from Switzerland (e.g. GPS-PS1E or GPS-MS1E, see http://www.u-blox.ch/gps/gps-ps1e/index.html) or SiRF USA (e.g. SiRFstarI or SiRFstarII, see http://www.sirf.com/products.html).

Preferably, the internal interface between the circuitry of handset 102c and GPS receiver 102a is an RS-232 interface. However any other serial or parallel interface can be utilized.

Another option is utilizing a TU unit that is based on a cellular handset, which already includes an original "built-in" GPS receiver, such as made by SiRF USA (e.g. SiRFstarI or SiRFstarII, see http://www.sirf.com/products.html), and add a BT radio. The embedded BT radio is, for example, a CSRs BC01M2 module. In this option, the additional BT module may be preferably interfaced over a serial RS-232 link, or any other serial or parallel interface.

It is assumed that the CPU of handset 102c is capable of controlling BT radio 102b and GPS receiver 102a, in addition to its original tasks as a cellular phone. In order to carry out its new tasks, a proper software module is affiliated into handset 102c; i.e., into the integrated TU, to enable a position fix by GPS 102a, as well as the communication with nearby tag(s), through BT radio 102b.

Whenever BT radio 102b receives a data signal from a nearby tag (not shown), the corresponding data is temporarily stored in Flash memory 201, or, alternatively, in a different memory (not shown) that is embedded in the integrated cellular handset 102.

Still referring to FIG. 2, Bluetooth communication means 102b is embedded into tag 101 (shown in FIG. 1), and a similar one into TU 102, for interfacing cell phone handset 102c, according to a preferred embodiment of the invention. BT 102b is based on an Integrated Circuit (IC) manufactured by Cambridge Silicon Radio (CSR)—bc01 or bc01M or bc02, a 2.4 GHz antenna and powered by a 3-volts source, possibly a battery. Normally, bc01 chips require an external Erasable Programmable Read Only Memory (EPROM), preferably Flash EPROM, while bc01M or bc02 might utilize an optional EEPROM. One may refer to the web site http://www.csr.com/ for further information. A more general view can be found at http://www.bluetooth.com/, including a list of alternative products.

Figure 3:
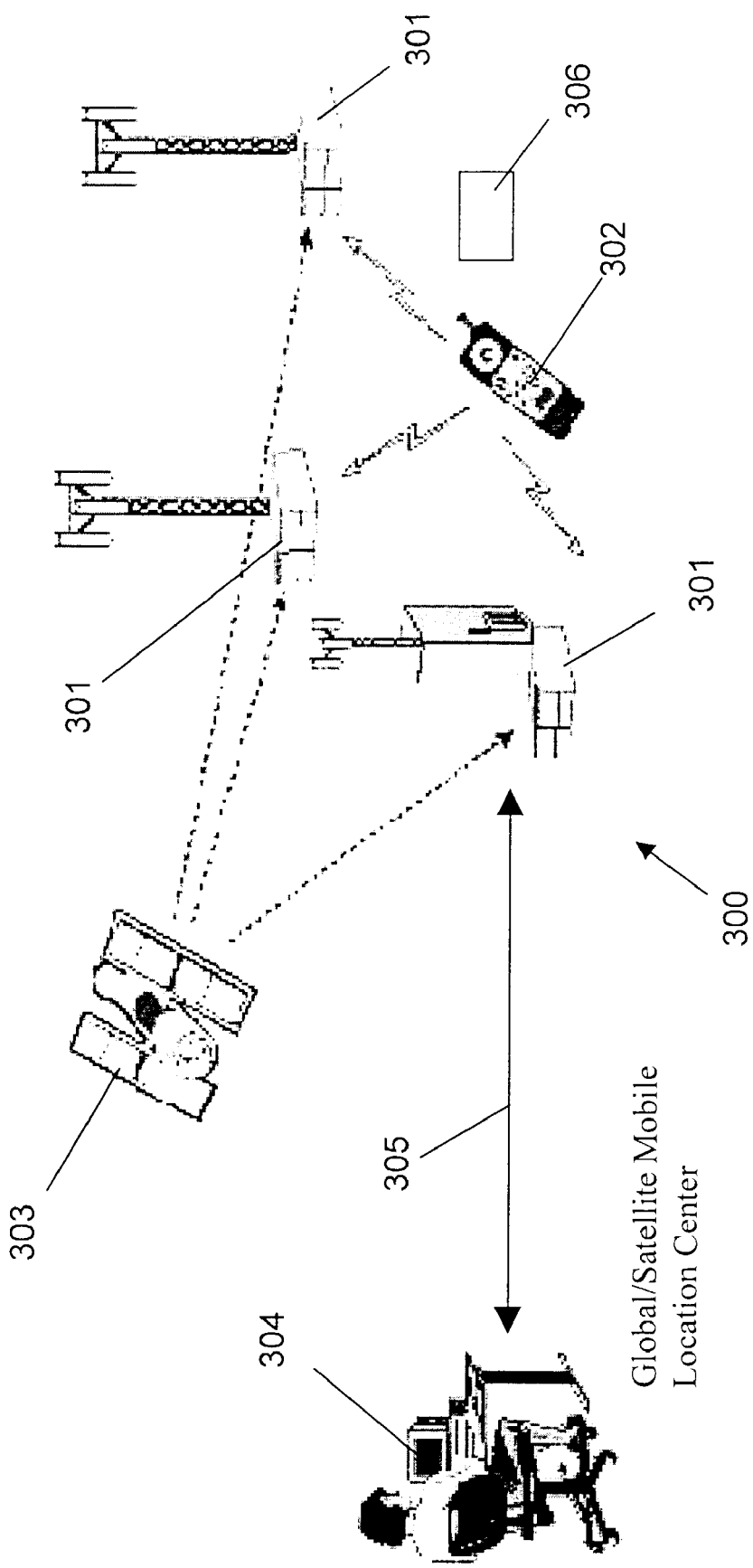
FIG. 3 illustrates in more details the communication network, shown in FIG. 1, according to a preferred embodiment of the invention.

FIG. 3 illustrates a general communication network 300, which comprises a plurality of base stations 301, cellular phone handsets TU, such as TU 302, a plurality of satellites, such as 303 and location center (or "Location Server"—LS) 304. Whenever required, LS 304 launches an interrogation signal by communication path 305 and over network 300, seeking a tag 306 having a specific ID. The signal is received by TU 302 via either one of base stations 301, with, or without, utilizing satellite 303.

The principles described hereinabove may be utilized in various ways. For example, roaming objects may be persons, animals, vehicles, goods, mailed/delivered items, ammunition and weapons. Additionally, the communication link between tags and TUs may be enabled during specific periods of time. It is also possible to relate to a sub group of tags and/or a sub group of TUs.

According to one aspect of the invention, a client connects, from a fixed or mobile computer or other I/O device as mobile phone or PDA, to the Location Server (LS), and inputs a password/code related to the ID of the tag, the location of which is to be determined/found. The LS then automatically initiates an interrogation session by launching/transmitting a corresponding interrogation signal, and after receiving an answer message from the corresponding TU, the LS reports the requested tag's location to the client. According to another approach, clients may call the LS operator over the phone, asking for locating a specific tag. The LS operator then initiates an interrogation session and reports back the interrogation results to the client(s).

According to one aspect of the invention, the trigger for establishing a communication between the tag and a TU comes from an external device (e.g. an alarm system or sensor) interfacing the tag, in order to save the tag's battery power.

According to another embodiment of the invention, the accuracy of the tag location can be refined by obtaining the distance and/or direction information related to the relative position between the tag and the corresponding TUs. If either the TU or the tag can assess the range or direction to the opposite device by other methods (e.g. methods for calculating the range between two BT-based units), this assessment may be processed in order to refine the tag's location (which otherwise is assessed as the nearby TU location). An additional refinement can be achieved by extrapolating the TU's position in case when the transmission from the tag to the TU and the determination of the location of the TU are performed at different times.

According to one aspect of the invention, the tag is utilized for determining the location of a child that was lost, for example, in an amusing park. In this case, the child wears the tag as a wristwatch and this tag does not initiate inquiries but periodically monitors possible interrogation signals. Once the person that escorted the child suspects that the child is lost, he/she uses his cellular phone to contact a control center (e.g., an LS server), asking for a location service. Upon inputting the ID of the child's tag, or any other password related unambiguously to this tag, the control center broadcasts an interrogation signal over the cellular network, interrogating for this tag. Consequently, cellular phones try to establish a BT connection with this specific tag, including phones of other people visiting this park. Once a connection is established, the child's location is determined and the control center calls back the child's escort and reports the child's location, guiding him/her to the child, preferably assisted by a digital map displayed on his/her mobile phone.

According to one aspect of the invention, the LS is capable of directing an interrogation signal to a (selected) specific limited geographical region(s), wherein a specific tag (the location of which is to be determined) is expected to be found (e.g. in an amusing park), thereby avoiding disturbing other parts/areas of the network to which this specific interrogation session is not relevant. Failing to find the specific tag in a specific area, the search for the tag might be selectively extended to other areas.

According to another aspect of the invention, whenever an intruder breaks into a vehicle to which a wireless tag is affixed, the wireless tag is used for detecting the presence and the location of the intruder by utilizing his own cell phone. In this case, the car's alarm system integrates a wireless tag. Once the alarm system detects that the car was been intruded unlawfully, it triggers the tag, which in turn tries to establish a BT link with a nearby BT enabled cellular phone. In case that the intruder carries such a device, the tag transfers to the intruder's phone its ID and a pre-defined message code that indicates the alarm status. Upon interpreting the alarm code, the cellular phone transmits the data to the LS, or to a linked control center, where appropriate measures are taken. The control center is capable of keeping track of the location of the car (and of the intruder, while driving the car). If at some point the intruder leaves the car, his location can be further tracked after he moves away from the car, while the car's last known location is recorded at the place where the intruder deserted it.

According to one aspect of the invention, communication is enabled when the TU and/or the tag are part of a predetermined sub group. For example, due to economical and/or security reasons, the army may wish that tags, attached to military objects, such as weapons, vehicles and soldiers will respond only to interrogation signals that are transmitted from its authorized TUs.

According to another aspect of the invention, a "time window/gap" may be added as a criterion for activating a tag report. For example, it is supposed that a museum is open to the public at specific working hours. A wireless tag is affixed to each object/item that should be protected in the museum. At non-working hours, tags try to establish a BT link with passing-by cellular phones, excluding some predefined phones that belong to the museum staff. These tags are registered in the control center, together with the cell phone ID numbers of the employees. Thus, whenever a non-listed BT enabled cellular phone passes by the protected objects at non-working hours, a proper alarm message is transmitted by the tag affixed to the object, by the passing-by phone, to the control center.

According to another aspect of the invention, additional criteria may be used to trigger a tag's report, as data resulting from interaction between tags. For example, a wireless tag is utilized for tracking (valuable) goods as they are transported from one place to another. Such goods may be gasoline/oil/gas containers, dangerous and/or precious chemicals, precious stones, diamonds, money/bonds, weapons, gold/silver/platinum bars, electronic equipment (e.g., television sets, computers, stereo radio, video sets) etc. According to this aspect, a wireless tag is affixed to the vehicle carrying the goods, as well as to each item/good (wherever possible). As long as the tags attached to the transported goods detect the vehicle tag, their state is defined as normal. Once these tags cannot communicate with the vehicle tag, over BT communication, this may lead to a conclusion that goods have been stolen, and each tag is triggered to report its status (and therefore, its location), using any passing-by BT enabled cellular device as a gateway.

The above examples and description have of course been provided only for the purpose of illustration, and are not intended to limit the invention in any way. As will be appreciated by the skilled person, the invention can be carried out in a great variety of ways, employing more than one technique from those described above, such as providing communication capabilities between tags, all without exceeding the scope of the invention.

The invention claimed is:

1. A communication system for determining geographical location of roaming objects in a vicinity of a plurality of communication devices, comprising:

a) a communication network, consisting of at least said plurality of communication devices, said plurality of communication devices configured to communicate with other communication devices over said communication network, and establishing a short range wireless communication with other wireless devices in the vicinity of said plurality of communication devices, said communication network is configured for obtaining the geographical location of said plurality of communication devices and transmitting data representing said geographical location to a destination, over said communication network;

b) a wireless tag, attached to each of said roaming objects, being a wireless device, in which a unique data is stored, said tag is configured for communicating with said plurality of communication devices via said short range and transmitting said unique data to said destination through said plurality of communication devices and over said communication network, wherein said tag comprises:
   a) a short-range wireless transceiver for communicating with said plurality of communication devices being in the vicinity of said tag;
   b) a memory for storing the unique data; and
   c) a control circuitry for controlling the communication between said tag and said communication device; and c) a control center being linked to said destination, for receiving said unique data from said tag and for using said unique data and the location of the plurality of communication devices, through which said unique data is transmitted, for determining and displaying the geographical location of said tag, wherein the control center communicates with the plurality of communication devices for the presence of tags in their vicinity, according to at least one of the following parameters: a tag's identification; time at which said unique data is transmitted; a geographical region; identification of said plurality of communication devices and a trigger signal generated at the tag or input to the tag.

2. A system according to claim 1, in which each said plurality of communication devices comprises:
   a) a short-range wireless transceiver for communicating with one or more wireless tags being in the vicinity of said plurality of communication devices;
   b) a memory for storing multiple unique data transmissions from the same tag, and/or said unique data transmissions from different tags;
   c) circuitry for transmitting said data to the destination, over the communication network; and
   d) a control circuitry for controlling the communication between said plurality of communication devices and said tags and the transmission of said unique data over said communication network.

3. A system according to claim 1, in which each said plurality of communication devices further comprises:
   a) location determining circuitry for determining the geographical location of said communication devices; and
   b) circuitry for transmitting data representing said location to the destination.

4. A system according to claim 1, wherein the data representing the location of the plurality of communication devices or the data provided by the tag are affiliated into the control signals that are transmitted from said plurality of communication devices over the communication network.

5. A system according to claim 3, wherein the data representing the location of the plurality of communication device is determined by utilizing satellite signals received from a navigation system such as Global Positioning System (GPS) or Galileo or GLONASS.

6. A system according to claim 1, wherein the communication network is a cellular or mobile or wireless network.

7. A system according to claim 1, wherein the plurality of communication devices are selected from the group: mobile telephones; cellular telephones; wireless telephones; portable computers; PDAs; WAN-LAN gateways or APs (Access Points); WAN-PAN gateways or APs; LAN-PAN gateways or APs.

8. A system according to claim 1, wherein the communication between the tag and the plurality of communication devices complies with a communication standards selected from the group: Bluetooth; WiFi; WiMax; HomeRF.

9. A system according to claim 1, wherein the data representing the location of the plurality of communication devices is determined either by the communication network or by the plurality of communication devices or by a combination thereof.

10. A system according to claim 1, wherein the communication between said tags and said plurality of communication devices is established using unlicensed frequency band.

11. A system according to claim 1, wherein the time at which the unique data is transmitted to said plurality of communication devices, is recorded by the plurality of communication devices.

12. A system according to claim 1, wherein whenever the plurality of communication device receives a new data signal and its corresponding memory is full, the oldest data stored in said memory is overwritten by said new data.

13. A system according to claim 1, wherein the utilization of said plurality of communication devices for locating said tags does not require the subscriber permission or wherein a subscriber that owns or operates said plurality of communication device permits utilizing said plurality of communication devices for locating said tags.

14. A system according to claim 1, wherein the data representation of the location of said tag is converted from geographic coordinates to a corresponding physical address.

15. A system according to claim 1, wherein the initiation to determine location of said tag comes from said tag and/or said plurality of communication devices and/or said control center, and/or an input to said tag and/or an input to said plurality of communication devices and/or an input to said control center.

16. A system according to claim 1, wherein the communication between said tag and said plurality of communication devices is enabled during a specific period of time and/or when said plurality of communication devices and/or said tag are part of a predetermined sub group.

17. A system according to claim 1, wherein the location accuracy of the tag is refined by obtaining a distance and/or a direction information related to the relative position between the tag and the plurality of communication devices.

18. A system according to claim 1, wherein the roaming object is selected from the following group: persons; animals; vehicles; goods; mailed/delivered items; weapons; ammunition.

19. A system according to claim 1, wherein the location accuracy of the tag is refined by extrapolation, when the transmission of the unique data from the tag to the plurality of communication devices and the determination of the location of the plurality of communication devices are performed at different times.

20. A system according to claim 1, wherein the control center is a communication device.

21. A system according to claim 1, wherein said tag and/or said plurality of communication devices relay/retransmit data that arrives from other tags and/or said plurality of communication devices.

* * * * *